US008233802B2

(12) United States Patent  
Friedman

(10) Patent No.: US 8,233,802 B2
(45) Date of Patent: Jul. 31, 2012

(54) PORTABLE INFRARED CONTROL LIAISON

(75) Inventor: Lee G. Friedman, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 273 days.

(21) Appl. No.: 12/651,297

(22) Filed: Dec. 31, 2009

(65) Prior Publication Data

US 2011/0158652 A1 Jun. 30, 2011

(51) Int. Cl.
H04B 10/00 (2006.01)

(52) U.S. Cl. .......................... 398/106; 398/107; 398/116

(58) Field of Classification Search .................. 398/116, 398/124–125, 127–128, 130, 106–113
See application file for complete search history.

(56) References Cited

U.S. PATENT DOCUMENTS

| | | | |
|---|---|---|---|
| 4,807,222 A | 2/1989 | Amitay | |
| 4,975,926 A | 12/1990 | Knapp | |
| 5,191,461 A | 3/1993 | Cranshaw et al. | |
| 5,218,356 A | 6/1993 | Knapp | |
| 5,491,457 A | 2/1996 | Feher | |
| 5,953,507 A | 9/1999 | Cheung et al. | |
| 6,034,621 A | 3/2000 | Kaufman | |
| 6,044,436 A | 3/2000 | Otsuka | |
| 6,070,199 A | 5/2000 | Axtman et al. | |
| 6,119,179 A | 9/2000 | Whitridge et al. | |
| 6,445,749 B2 | 9/2002 | Feher | |
| 6,636,249 B1 | 10/2003 | Rekimoto | |
| 6,768,450 B1 | 7/2004 | Walters et al. | |
| 6,901,439 B1 | 5/2005 | Bonasia et al. | |
| 6,914,695 B2 | 7/2005 | Walters et al. | |
| 7,027,767 B2 | 4/2006 | de La Chapelle et al. | |
| 7,034,747 B1 | 4/2006 | Walters et al. | |
| 7,065,658 B1 | 6/2006 | Baraban et al. | |
| 7,219,141 B2 | 5/2007 | Bonasia et al. | |
| 7,308,254 B1 | 12/2007 | Rissanen | |
| 7,450,854 B2 | 11/2008 | Lee et al. | |
| 7,609,837 B2 | 10/2009 | Bennett | |
| 7,685,524 B2 | 3/2010 | Rekimoto | |
| 7,716,606 B2 | 5/2010 | Rekimoto | |
| 7,860,450 B2 | 12/2010 | Rissanen | |
| 7,916,869 B2 | 3/2011 | Xu et al. | |
| 2001/0002202 A1 | 5/2001 | Feher | |
| 2003/0030839 A1 | 2/2003 | Walters et al. | |
| 2003/0114178 A1 | 6/2003 | Chapelle et al. | |
| 2004/0056902 A1 | 3/2004 | Rekimoto | |
| 2004/0174896 A1 | 9/2004 | Caspi et al. | |
| 2004/0177371 A1 | 9/2004 | Caspi et al. | |
| 2005/0024495 A1 | 2/2005 | Hamrelius et al. | |
| 2005/0135811 A1 | 6/2005 | Lee et al. | |

(Continued)

Primary Examiner — Dzung Tran
(74) Attorney, Agent, or Firm — Jackson Walker L.L.P.

(57) ABSTRACT

A remote control liaison device for use in controlling a remote controlled device via a LAN device includes a processor, a wireless transceiver, a remote control signal emitter, a remote control signal emitter adapter, an infrared signal detector, an indicator signal light, a power interface, and memory media accessible to the processor. The memory media may include instructions executable by the processor to establish a communication channel between the remote control liaison device and the LAN device using the wireless transceiver; convert a remote control command signal received from the LAN device for control of the remote controlled device into a device command executable by the remote controlled device; and send an infrared command signal corresponding to the device command to the remote controlled device using at least one of the remote control signal emitter and a second remote control signal emitter connected to the remote control signal emitter adapter.

19 Claims, 5 Drawing Sheets

U.S. PATENT DOCUMENTS

| | | |
|---|---|---|
| 2005/0152309 A1 | 7/2005 | Kamiya |
| 2006/0009861 A1 | 1/2006 | Bonasia et al. |
| 2007/0038960 A1 | 2/2007 | Rekimoto |
| 2007/0050615 A1 | 3/2007 | Xu et al. |
| 2007/0061575 A1 | 3/2007 | Bennett |
| 2007/0106764 A1 | 5/2007 | Mansfield |
| 2007/0255348 A1* | 11/2007 | Holtzclaw ................. 607/60 |
| 2008/0070626 A1 | 3/2008 | Song |
| 2008/0076470 A1 | 3/2008 | Ueda et al. |
| 2008/0097855 A1 | 4/2008 | Rissanen |
| 2008/0192812 A1* | 8/2008 | Naeve et al. ............... 375/222 |
| 2009/0033485 A1* | 2/2009 | Naeve et al. ............ 340/539.23 |
| 2009/0055478 A1 | 2/2009 | Hara |
| 2010/0198867 A1 | 8/2010 | Rekimoto |
| 2010/0299712 A1* | 11/2010 | Austin et al. ................. 725/81 |
| 2011/0044690 A1* | 2/2011 | Al-Kadi et al. ............... 398/66 |
| 2011/0066485 A1 | 3/2011 | Rissanen |

\* cited by examiner

PORTABLE INFRARED CONTROL LIAISON

BACKGROUND

1. Field of the Disclosure

The present disclosure relates to remote control and, more particularly, to infrared (IR) remote control devices to remotely operate a device.

2. Description of the Related Art

Remote controls provide convenient operation of equipment from a distance. Many consumer electronic devices are equipped with a variety of remote control features capable of being operated by dedicated remote control devices.

DESCRIPTION OF THE EMBODIMENT(S)

Figure 1:
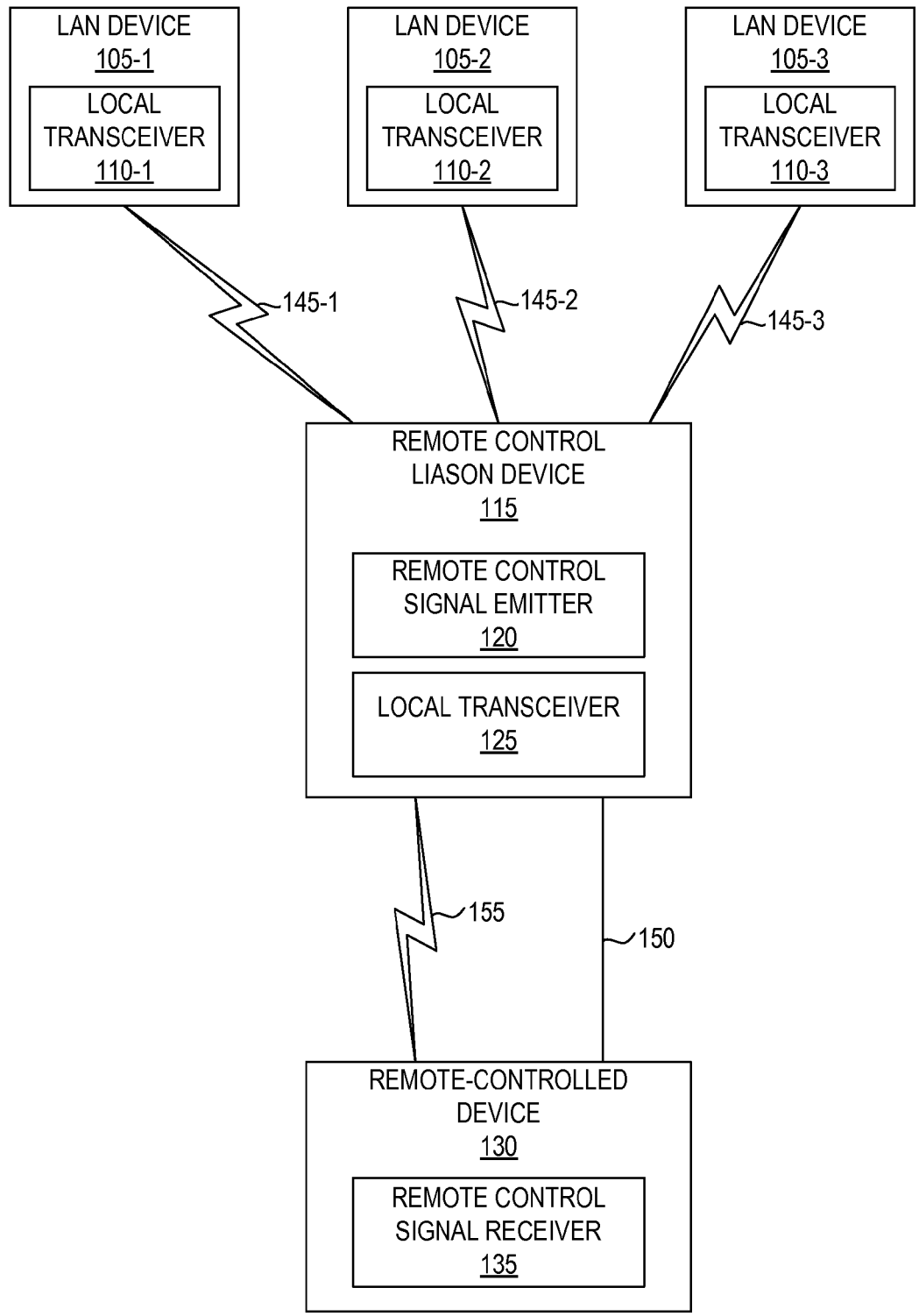
FIG. 1 is a block diagram of selected elements of an embodiment of a remote control system.

In one aspect, a remote control liaison device includes a wireless transceiver, a remote control signal emitter, a processor, and memory media accessible to the processor. The memory media may include instructions executable by the processor to establish a communication channel between the remote control liaison device and a LAN device using the wireless transceiver, convert a remote control command signal received from the LAN device for control of a remote controlled device into a device command executable by the remote controlled device, and send an infrared command signal corresponding to the device command to the remote controlled device using the remote control signal emitter. The remote control liaison device may further include a power interface. In one embodiment, the power interface may be configured to couple to a power source. In further embodiments, the power interface may be a USB connector. The USB connector may be configured to couple the remote control liaison device in close proximity to the remote controlled device and the remote control liaison device may receive power from the remote controlled device.

In certain embodiments, the memory media may further include instructions executable by the processor to determine, responsive to establishing the communications channel, if the LAN device is authorized to transmit the remote control command signal for control of the remote controlled device and to receive configuration data. The configuration data may include information for converting the remote control command signal into the device command. In one embodiment, the configuration data may be received from the LAN device. The configuration data may be received using the wireless transceiver. In other embodiments, the configuration data may be received using a USB interface coupled to the LAN device.

The remote control liaison device may further include an indicator signal light. In one embodiment, the indicator signal light may be configured to occupy a plurality of states wherein each state indicates a status of the remote control liaison device. The memory media may further include instructions executable by the processor to determine the status of the remote control liaison device; and responsive to the determined status, cause the indicator signal light to occupy a corresponding state selected from one of the plurality of states. The states of the indicator signal light may be selected from one of the following: constant on, constant off, intermittent on/off.

In a further embodiment, a remote control liaison device includes a wireless receiver, a first remote control signal emitter, a remote control signal emitter interface configured to receive a second remote control signal emitter, a processor, and memory media accessible to the processor. The memory media may include instructions executable by the processor to receive a remote control command signal from the LAN device using the wireless receiver, convert the remote control command signal into an infrared command signal executable by a remote controlled device, and send infrared command data corresponding to the infrared command signal to the remote controlled device using at least one of the remote control signal emitter and the remote control signal emitter interface. The remote control liaison device may further include a network adapter configured to connect to at least one of the LAN device and the remote controlled device. In one embodiment, the network adapter may be a power interface. In one embodiment, the network adapter may include a USB interface. The network adapter may provide power for the remote control liaison device from at least one of the LAN device and the remote controlled device.

In yet another aspect, the remote control liaison device may receive configuration data from the LAN device using at least one of the network adapter and the wireless transceiver. In given embodiments, the remote control liaison device may include an infrared signal detector and the memory media may further include instructions executable by the processor to receive infrared command signals using the infrared signal detector, and to store the received infrared command signals.

In one embodiment, the remote control liaison device may include a wireless transceiver, a first remote control signal emitter, a remote control signal emitter interface configured to receive a second remote control signal emitter, a processor, and memory media accessible to the processor. The memory media may include instructions executable by the processor to establish a communication channel between the remote control liaison device and a LAN device using the wireless transceiver, convert a first remote control command signal received from the LAN device into a first device command executable by a first remote controlled device, convert a second remote control command signal received from the LAN device into a second device command executable by a second remote controlled device, send a first infrared command signal corresponding to the first command signal to the first remote controlled device using at least one of the remote control signal emitter and the remote control signal emitter interface; and send a second infrared command signal corresponding to the second command signal to the second remote controlled device using at least one of the remote control signal emitter and the remote control signal emitter interface.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Referring now to FIG. 1, a block diagram of selected elements of a remote control system 100 are depicted. Remote control system 100 illustrates devices, interfaces, and information that may be processed in order to control remote controlled device 130. In particular, remote control system 100 depicts remote control liaison device 115 configured to wirelessly receive remote control command signals from any of LAN devices 105-1, 105-2, and 105-3, convert the remote control command signals into device commands executable by remote controlled device 130, and send infrared command signals corresponding to the device commands to remote controlled device 130 for execution by remote controlled device 130, as will be described in detail below.

In remote control system 100, remote controlled device 130 represents any of a number of different types of devices that may be controlled remotely, such as media players, televisions, stereo components, or client-premises equipment (CPE) for multimedia content distribution networks (MCDNs), among others. As used herein, a "LAN device" is a device that may be associated with a user and that is configured for LAN or wide area network (WAN) connectivity and further configured to store and execute program instructions. LAN devices may include, but are not limited to, such devices as personal computers, wireless communications devices, and mobile electronic devices.

As will be described in detail herein, remote control liaison device 115 may be configured to receive a wireless communication command from LAN device 105. In certain embodiments, the wireless communication command may involve sending, via LAN device local transceiver 110, a remote control command signal to be converted by remote control liaison device 115 into an infrared device command and sent to remote controlled device 130 for execution by remote controlled device 130. In other words, LAN device 105 may send command data, including remote control command signals, to remote control liaison device 115. Upon receiving command data from LAN device 105, remote control liaison device 115 may execute a remote control emulation module to convert the received command data into an infrared device command corresponding to the remote control command signal, and transmit the infrared device command to remote controlled device 130, so that remote controlled device 130 may execute a function corresponding to the remote control command signal sent by the LAN device. In this manner, a user of remote control system 100 may be provided a simplified, yet flexible interface by way of remote control liaison device 115 for operating an infrared command and control based device (such as remote controlled device 130) using LAN device 105.

As shown in FIG. 1, LAN device 105, which may be a personal computer or a hand-held and manually operated device, includes local transceiver 110, and may include additional elements (not shown in FIG. 1) in various embodiments. As depicted in FIG. 1, multiple LAN devices 105 may be included in remote control system 100. Also as depicted in FIG. 1, LAN device 105 may communicate wirelessly with remote control liaison device 115 using wireless communication link 145. The wireless connection established using wireless communication link 145 may substantially conform to at least one wireless network standard defined by: IEEE 802.11, IEEE 802.15.1, and IEEE 802.15.4.

Remote control liaison device 115, as shown in FIG. 1, may include local transceiver 125 for communicating with LAN device 105 and remote control signal emitter 120 for sending remote control command signals, using wireless communication link 155, to remote controlled device 130. Remote control liaison device 115 may be coupled to remote controlled device 130 using coupling mechanism 150. Remote control liaison device 115 may also be configured to attach to remote controlled device 130. Remote control liaison device 115 may include additional elements (not shown in FIG. 1) in various embodiments.

Remote controlled device 130, as shown in FIG. 1, may include remote control signal receiver 135 for receiving remote control command signals from remote control liaison device 115 using wireless communication link 155.

Figure 2:
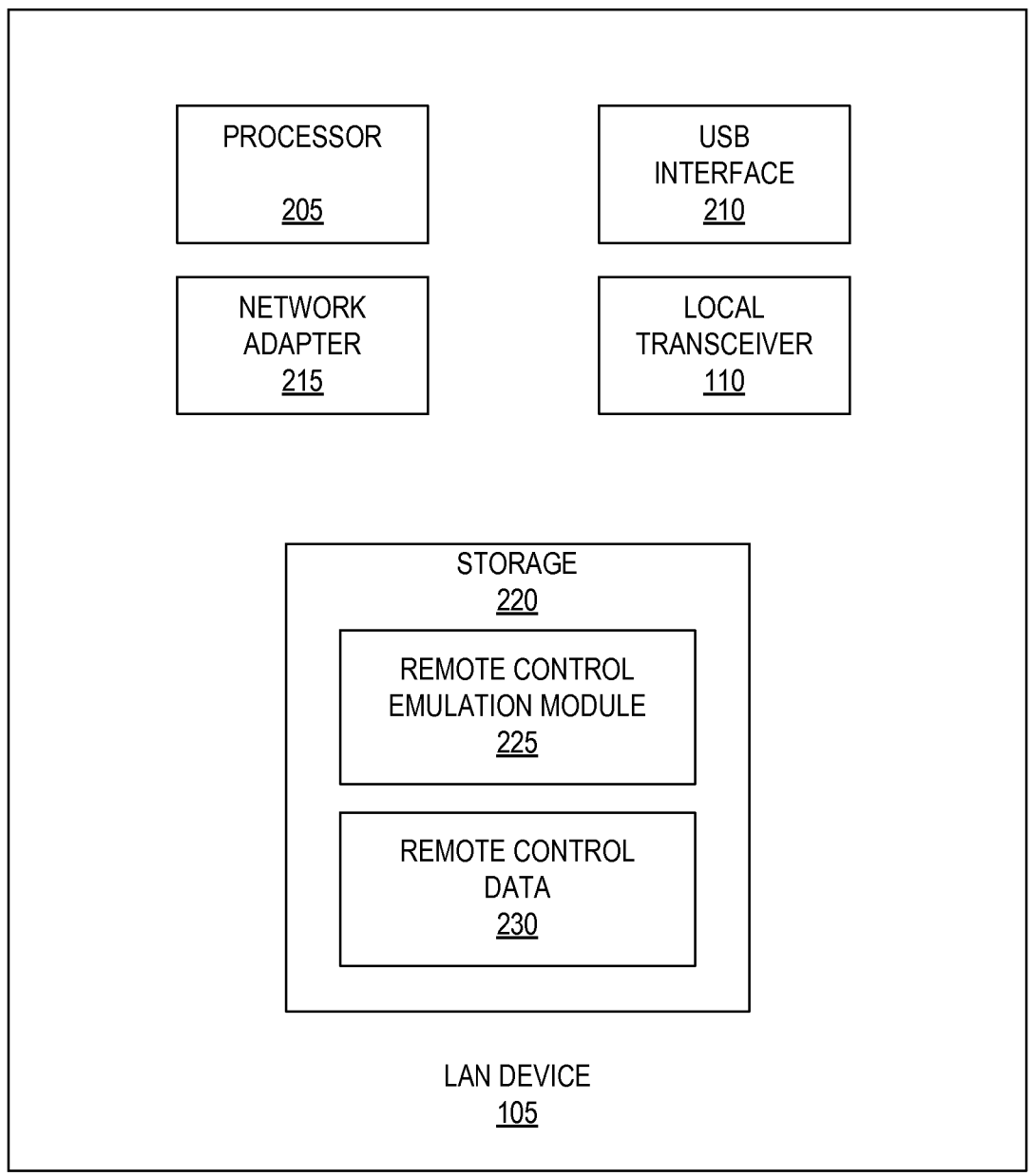
FIG. 2 is a block diagram of selected elements of an embodiment of a local area network (LAN) device.

Referring now to FIG. 2, LAN device 105 is shown including processor 205, universal serial bus (USB) interface 210, network adapter 215, local transceiver 110, and storage 220. Storage 220 is depicted in FIG. 2 including remote control emulation module 225 and remote control data 230. Accordingly, LAN device 105 may comprise elements configured to function as an embodiment of an electronic device capable of executing program instructions and communicating to other devices via a LAN/WAN. LAN device 105 may further include at least one shared bus (not shown in FIG. 2) for interconnectivity among internal elements, such as those depicted in FIG. 2.

Processor 205 may represent at least one processing unit and may further include internal memory, such as a cache for storing processor executable instructions. In certain embodiments, processor 205 serves as a main controller for LAN device 105. In various embodiments, processor 205 is operable to perform remote control operations, including input detection and related processing operations, as described herein.

LAN device 105, as depicted in FIG. 2, further includes network adapter 215 that may interface LAN device 105 to a local area network or that may further enable connectivity to a wide area network (WAN) for receiving and sending data. Local transceiver 110 represents an interface of LAN device 105 for communicating with external devices, such as remote control liaison device 115 (see FIG. 1). In the depicted embodiment, local transceiver 110 is a wireless transceiver, configured to send and receive radio frequency (RF) or other signals to external devices, such as remote control liaison device 115. USB interface 210, as depicted in FIG. 2, may provide a mechanical interface for coupling to an external device, such as a plug, socket, or other proximal adapter.

In FIG. 1, LAN device 105 is depicted communicating with remote control liaison device 115 via wireless communications link 145. Communication with remote control liaison device 115 may occur using local transceiver 110. It is noted that responses, such as commands, information, or acknowledgements, may be received from remote control liaison device 115 via wireless communications link 145. In one embodiment, a remote control command signal may be sent to remote control liaison device 115 and an acknowledgement of the message may be received by LAN device 105 from remote control liaison device 115.

Also in FIG. 2, storage 220 encompasses persistent and volatile media, fixed and removable media, magnetic and semiconductor media, or a combination thereof. Storage 220 is operable to store instructions, data, or both. Storage 220 as shown includes data, which may be in the form of sets or sequences of instructions, namely, remote control emulation module 225 and remote control data 230. Remote control emulation module 225 may include processor executable instructions to interpret user inputs and, in response, transmit wireless communication commands. In one embodiment, remote control data 230 may include device command data for controlling the functions of one or more remote controlled devices. Such device command data may be referred to herein as configuration data. LAN device 105 may receive updated remote control data 230 from to time to reflect changes to the configuration data in response to the addition of additional, or changes to existing, remote controlled devices that may be controlled using remote control liaison device 115. Wireless communication commands may include remote control command signals corresponding to remote control functions executable by remote controlled device 130, as described herein.

Figure 3:
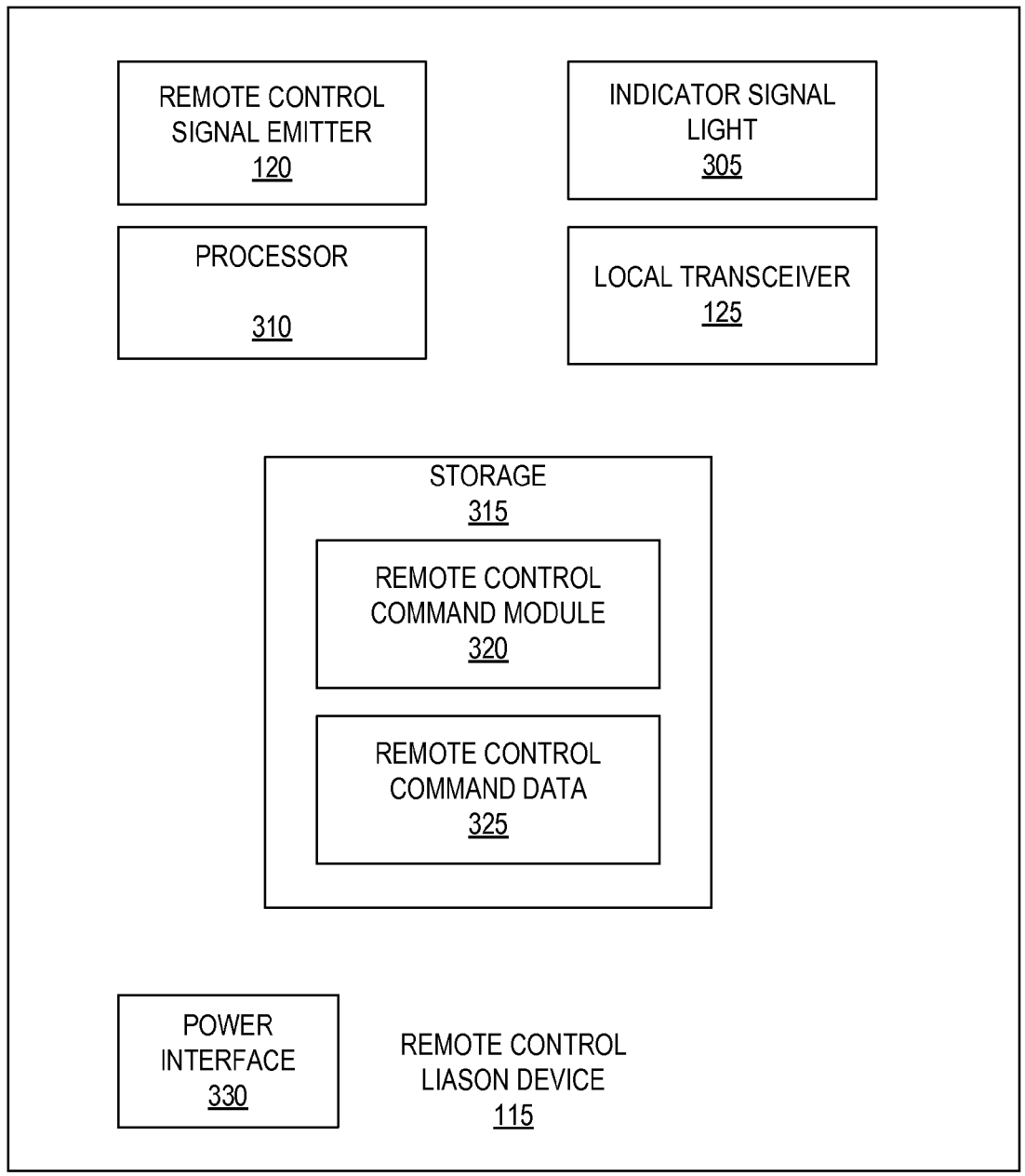
FIG. 3 is a block diagram of selected elements of an embodiment of a remote control liaison device.
Figure 4:
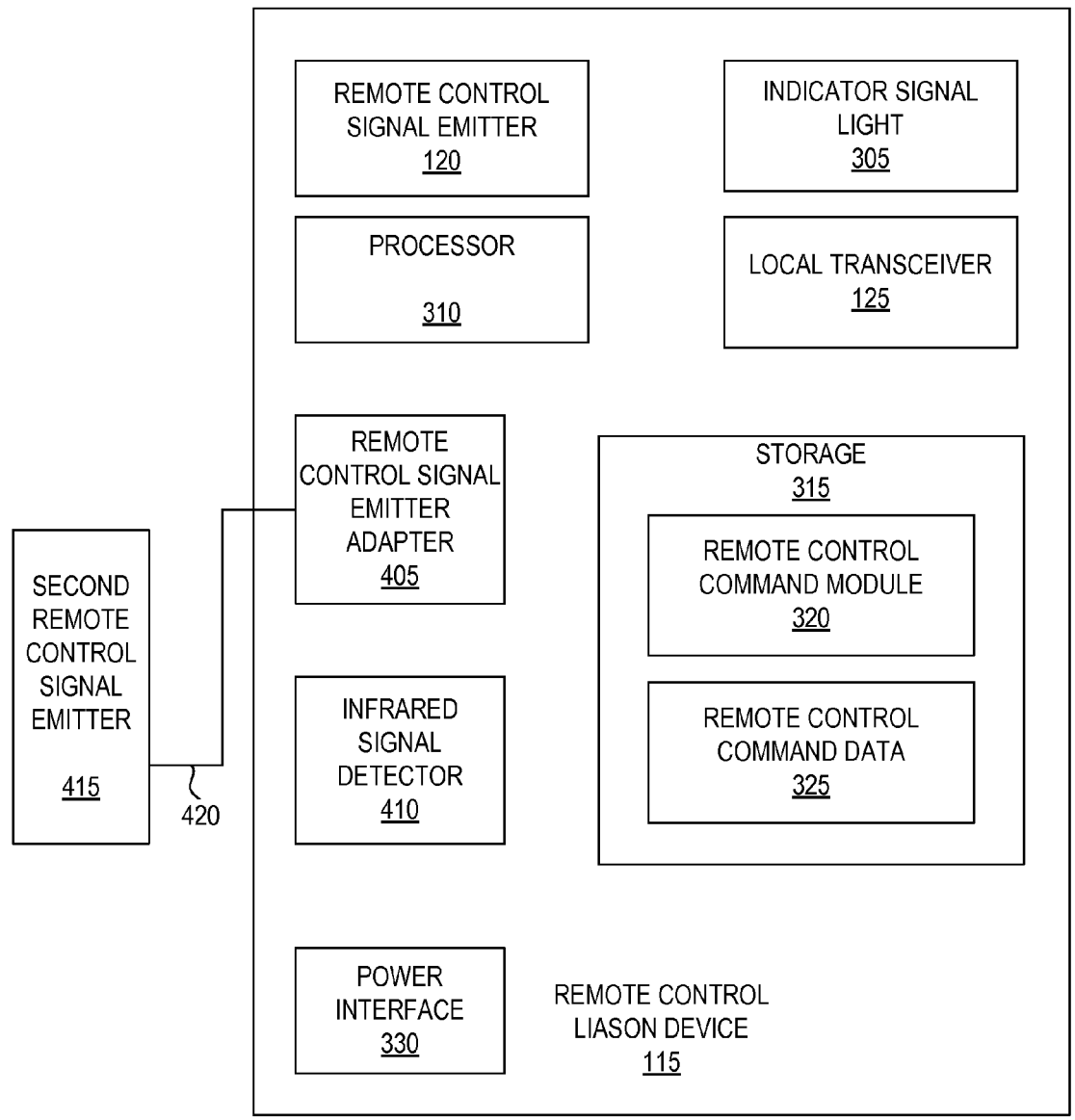
FIG. 4 is a block diagram of selected elements of an embodiment of a remote control liaison device.

Referring now to FIGS. 3 and 4, block diagrams of selected elements of embodiments of remote control liaison device 115 are shown. In FIG. 3, remote control liaison device 115 is shown including remote control signal emitter 120, indicator signal light 305, processor 310, local transceiver 125, power interface 330, and storage 315. Storage 315 is depicted in FIG. 3 including remote control command module 320 and remote control command data 325. Accordingly, remote control liaison device 115 may comprise elements configured to function as an embodiment of an electronic device capable of communicating to other devices, including LAN device 105, via a LAN/WAN, receiving command signals from such other devices, converting the received command signals into infrared command signals, and transmitting the infrared command signals to a remote controlled device, including remote controlled device 130. In a further embodiment, remote control liaison device 115 may be capable of coupling, via power interface 330, to a device, including remote controlled device 130, and further capable of receiving power from the device to which it is coupled, including remote controlled device 130. Remote control liaison device 115 may further include at least one shared bus (not shown in FIG. 3 or 4) for interconnectivity among internal elements, such as those depicted in FIGS. 3 and 4. In some embodiments, power interface 330 may include a network adapter.

Processor 310 may represent at least one processing unit and may further include internal memory, such as a cache for storing processor executable instructions. In various embodiments, processor 310 is operable to perform remote control operations, including detection of remote control command signals and related processing operations, as described herein.

Local transceiver 125 represents an interface of remote control liaison device 115 for communicating with external devices, such as LAN device 105 (see FIG. 1). In the depicted embodiment, local transceiver 125 is a wireless transceiver, configured to send and receive RF or other signals to external devices, such as LAN device 105. Power interface 330, as depicted in FIG. 3, may provide a mechanical interface, such as a plug, socket, or other proximal adapter, including a USB connector, for coupling to an external device, such as remote controlled device 130.

In FIG. 1, remote control liaison device 115 is depicted communicating with LAN device 105 via wireless communications link 145. Communication with LAN device 105 may occur using local transceiver 125. It is noted that responses, such as commands, information, or acknowledgements, may be received from LAN device 105 via wireless communications link 145. In one embodiment, a remote control command signal may be received from LAN device 105 and an acknowledgement of the message may be sent to LAN device 105 by remote control liaison device 115. In alternative embodiments, remote control liaison device 115 may receive signals from LAN device 105 using a receiver (not depicted) such that remote control liaison device 115 may not communicate with LAN device 105 in a bi-directional manner.

Also in FIG. 3, storage 315 encompasses persistent and volatile media, fixed and removable media, magnetic and semiconductor media, or a combination thereof. Storage 315 is operable to store instructions, data, or both. Storage 315 as shown includes data, which may be in the form of sets or sequences of instructions, namely, remote control command module 320 and remote control command data 325. Remote control command module 320 may include processor executable instructions to interpret remote control command signals received from a device, such as LAN device 105, using local transceiver 125, and, in response, transmit infrared command signals, using remote control signal emitter 120, to a device, such as remote controlled device 130. In one embodiment, remote control command data 325 may include configuration data received from LAN device 105 and may be used to interpret the remote control command signals. Configuration data may be received by remote control liaison device 115 from LAN device 105 using local transceiver 125. In other embodiments, remote control liaison device 115 may be coupled to LAN device 105 by way of power interface 330 and receive configuration data from LAN device 105 using power interface 330. In a further embodiment, a receiver (not depicted) may be used to receive the remote control command signals. Infrared command signals may correspond to remote control functions executable by remote controlled device 130.

Indicator signal light 305, as depicted in FIG. 3, may represent at least one light source. In one embodiment, indicator signal light 305 may represent a light source installed on an exterior surface of remote control liaison device 115 and may be used to indicate the operational status of remote control liaison device 115. In one embodiment, indicator signal light 305 may occupy a constant on state if the communications channel is operational, an intermittent on/off state if the communications channel is not operational, and a constant off state if there is an error in the remote control liaison device. In an alternative embodiment, a change in the color of indicator signal light 305 may be used to indicate the operational status of remote control liaison device 115.

Remote control liaison device 115, as depicted in FIG. 4, further includes remote control signal emitter adapter 405 and infrared signal detector 410. Remote control signal emitter adapter 405 is configured to connect, by way of adapter 420, to a second remote control signal emitter 415 which is external to remote control liaison device 115. It will be appreciated that if a line of site between remote control signal emitter 120 of remote control liaison device 115 and a device intended to receive the infrared command signals sent by remote control liaison device 115 may not be established, a second remote control signal emitter 415 may be connected to remote control signal emitter adapter 405 such that a line of site with the device intended to receive the infrared command signals sent by remote control liaison device 115 may be established. In an alternative embodiment, remote control signal emitter 120 may be used to transmit infrared control signals to a first device and remote control signal emitter adapter 405, after being connected to a second remote control signal emitter, may be used to transmit infrared control signals to a second device.

Figure 5:
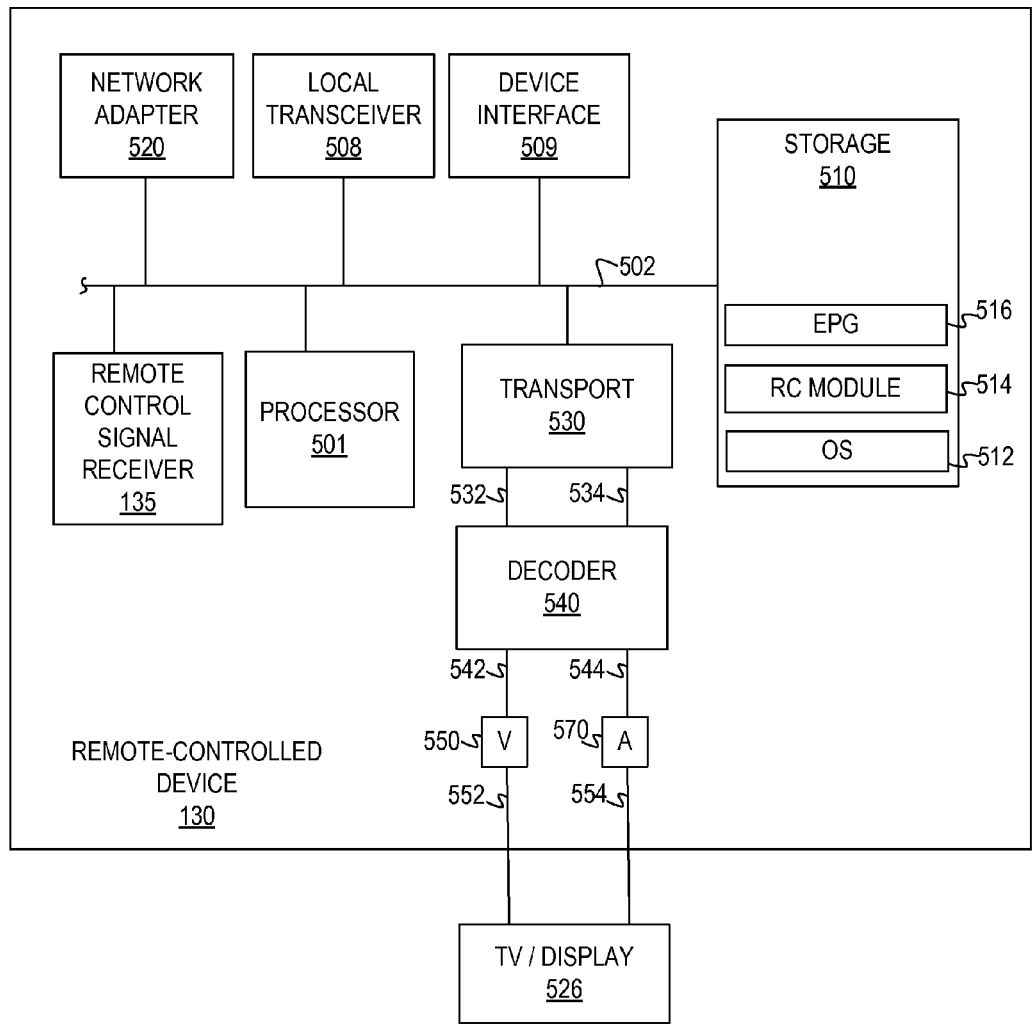
FIG. 5 is a block diagram of selected elements of an embodiment of a remote controlled device.

Referring now to FIG. 5, a block diagram illustrating selected elements of an embodiment of remote controlled device 130 is presented. As noted previously, remote controlled device 130 may represent any of a number of different types of devices that are remote controlled, such as media players, televisions, stereo components, or CPE for MCDNs, among others. In FIG. 5, remote controlled device 130 is shown as a functional component along with display 526, independent of any physical implementation, and may be any combination of elements of remote controlled device 130 and display 526.

In the embodiment depicted in FIG. 5, remote controlled device 130 includes processor 501 coupled via shared bus 502 to storage media collectively identified as storage 510. Remote controlled device 130, as depicted in FIG. 5, further includes network adapter 520 that may interface remote controlled device 130 to a local area network (LAN) through which remote controlled device 130 may receive and send multimedia content (not shown in FIG. 5). Network adapter 520 may further enable connectivity to a wide area network (WAN) for receiving and sending multimedia content via an access network (not shown in FIG. 5).

Remote controlled device 130, as depicted in FIG. 5, further includes device interface 509 that may be configured to permit coupling of remote controlled device 130 to remote control liaison device 115 and through which remote control liaison device 115 may receive power from remote controlled device 130. Device interface 509 may be a USB interface.

In embodiments suitable for use in internet protocol (IP) based content delivery networks, remote controlled device 130, as depicted in FIG. 5, may include transport unit 530 that assembles the payloads from a sequence or set of network packets into a stream of multimedia content. In coaxial based access networks, content may be delivered as a stream that is not packet based and it may not be necessary in these embodiments to include transport unit 530. In a coaxial implementation, however, tuning resources (not explicitly depicted in FIG. 5) may be required to "filter" desired content from other content that is delivered over the coaxial medium simultaneously and these tuners may be provided in remote controlled device 130. The stream of multimedia content received by transport unit 530 may include audio information and video information and transport unit 530 may parse or segregate the two to generate video stream 532 and audio stream 534 as shown.

Video and audio streams 532 and 534, as output from transport unit 530, may include audio or video information that is compressed, encrypted, or both. A decoder unit 540 is shown as receiving video and audio streams 532 and 534 and generating native format video and audio streams 542 and 544. Decoder 540 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 540 may employ any of various audio decoding algorithms including Dolby® Digital, Digital Theatre System (DTS) Coherent Acoustics, and Windows Media Audio (WMA).

The native format video and audio streams 542 and 544 as shown in FIG. 5 may be processed by encoders/digital-to-analog converters (encoders/DACs) 550 and 570 respectively to produce analog video and audio signals 552 and 554 in a format compliant with display 526, which itself may not be a part of remote controlled device 130. Display 526 may comply with National Television System Committee (NTSC), Phase Alternate Line (PAL) or any other suitable television standard.

Storage 510 encompasses persistent and volatile media, fixed and removable media, and magnetic and semiconductor media. Storage 510 is operable to store instructions, data, or both. Storage 510 as shown may include sets or sequences of instructions, namely, an operating system 512, a remote control application program identified as remote control module 514, and electronic programming guide (EPG) 516. Operating system 512 may be a UNIX or UNIX-like operating system, a Windows® family operating system, or another suitable operating system. In some embodiments, storage 510 is configured to store and execute instructions provided as services by an application server via the WAN (not shown in FIG. 5).

EPG 516 represents a guide to multimedia content available for viewing using remote controlled device 130, and may be shown to the user as an element of the user interface. The user interface may include a plurality of menu items arranged according to one or more menu layouts, which enable a user to operate remote controlled device 130. The user may operate the user interface, including EPG 516, using LAN device 105 and remote control liaison device 115.

Local transceiver 508 represents an interface of remote controlled device 130 for communicating with external devices. Local transceiver 508 may provide a mechanical interface for coupling to an external device, such as a plug, socket, or other proximal adapter. In some cases, local transceiver 508 is a wireless transceiver, configured to send and receive IR or RF or other signals. Local transceiver 508 may be accessed by remote control module 514 for providing remote control functionality.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A remote control liaison device, comprising:
   a wireless transceiver;
   a remote control signal emitter;
   an indicator signal light configured to indicate a status of the remote control liaison device, wherein the status is selected from a plurality of possible states;
   a processor; and
   memory media accessible to the processor, storing program instructions executable by the processor to:
      establish a communication channel between the remote control liaison device and a local area network device using the wireless transceiver;
      convert a remote control command signal received from the local area network device for control of a remote controlled device into a device command executable by the remote controlled device;
      send an infrared command signal corresponding to the device command to the remote controlled device using the remote control signal emitter; and
      responsive to determining the current status of the remote control liaison device, cause the indicator signal light to the current status.

2. The remote control liaison device of claim 1, further comprising:
   a power interface configured to couple to a power source.

3. The remote control liaison device of claim 2, wherein the power interface is a universal serial bus connector.

4. The remote control liaison device of claim 3, wherein the universal serial bus connector is configured to couple the remote control liaison device in close proximity to the remote controlled device, and further wherein the remote control liaison device receives power from the remote controlled device.

5. The remote control liaison device of claim 1, wherein the program instructions include instructions to:
   responsive to establishing the communications channel, determine if the local area network device is authorized to transmit the remote control command signal for control of the remote controlled device.

6. The remote control liaison device of claim 1, wherein the program instructions include instructions to:
receive configuration data, wherein the configuration data includes information for converting the remote control command signal into the device command.

7. The remote control liaison device of claim 6, wherein the configuration data is received from the local area network device.

8. The remote control liaison device of claim 7, wherein the configuration data is received via the wireless transceiver.

9. The remote control liaison device of claim 7, wherein the configuration data is received using a universal serial bus interface coupled to the local area network device.

10. The remote control liaison device of claim 1, wherein the plurality of possible light states include a constant on state, a constant off state, and an intermittent on/off state.

11. A remote control liaison device, comprising:
a wireless receiver;
a first remote control signal emitter;
a remote control signal emitter interface configured to receive a second remote control signal emitter;
an indicator signal light configured indicate a current status of the remote control liaison device, wherein the current status is selected from a plurality of possible states;
a processor; and
memory media, accessible to the processor, storing program instructions executable by the processor to:
receive a remote control command signal from the local area network device using the wireless receiver;
convert the remote control command signal into an infrared command signal executable by a remote controlled device;
send infrared command data corresponding to the infrared command signal to the remote controlled device using the remote control signal emitter interface and at least one of the first remote control signal emitter and the second remote controller signal emitter; and
responsive to the determining the current status of the remote control liaison device, cause the indicator signal light to indicate the current status.

12. The remote control liaison device of claim 11, further comprising:
a network adapter configured to connect to at least one of the local area network device and the remote controlled device.

13. The remote control liaison device of claim 12, wherein the network adapter includes a universal serial bus interface.

14. The remote control liaison device of claim 13, wherein the network adapter provides power for the remote control liaison device from at least one of the local area network device and the remote controlled device.

15. The remote control liaison device of claim 12, wherein the remote control liaison device receives configuration data from the local area network device using at least one of the network adapter and the wireless transceiver.

16. The remote control liaison device of claim 11, further comprising an infrared signal detector wherein the program instructions include instructions executable to:
receive infrared command signals using the infrared signal detector; and
store the received infrared command signals.

17. A remote control liaison device, comprising:
a wireless transceiver;
a first remote control signal emitter;
a remote control signal emitter interface configured to receive a second remote control signal emitter;
an indicator signal light wherein the indicator signal light is configured to occupy a plurality of states, wherein each state indicates a status of the remote control liaison device;
a processor; and
memory media accessible to the processor, including instructions executable by the processor to:
establish a communication channel between the remote control liaison device and a local area network device using the wireless transceiver;
convert a first remote control command signal received from the local area network device into a first device command executable by a first remote controlled device;
convert a second remote control command signal received from the local area network device into a second device command executable by a second remote controlled device;
send a first infrared command signal corresponding to the first command signal to the first remote controlled device using at least one of the remote control signal emitter and the remote control signal emitter interface;
send a second infrared command signal corresponding to the second command signal to the second remote controlled device using at least one of the remote control signal emitter and the remote control signal emitter interface;
determine the status of the remote control liaison device; and
responsive to the determined status, cause the indicator signal light to occupy a corresponding state selected from one of the plurality of states.

18. The remote control liaison device of claim 17 further comprising:
a universal serial bus connector.

19. The remote control liaison device of claim 18, wherein the remote control liaison receives power using the universal serial bus connector.

* * * * *